US012638118B2

(12) United States Patent (10) Patent No.: US 12,638,118 B2

Schneider et al. (45) Date of Patent: May 26, 2026

(54) FLOW-OPTIMIZED LINE CONNECTOR, AND LINE CONNECTOR ASSEMBLY

(71) Applicant: NORMA GERMANY GMBH, Maintal (DE)

(72) Inventors: David Schneider, Darmstadt (DE); Daniel Kintea, Groß-Umstadt (DE); Hannes Clasen, Frankfurt am Main (DE)

(73) Assignee: NORMA GERMANY GMBH, Maintal (DE)

( * ) Notice: Subject to any disclaimer, the term of this patent is extended or adjusted under 35 U.S.C. 154(b) by 11 days.

(21) Appl. No.: 18/693,326

(22) PCT Filed: Sep. 19, 2022

(86) PCT No.: PCT/EP2022/075969

§ 371 (c)(1),
(2) Date: Mar. 19, 2024

(87) PCT Pub. No.: WO2023/046633

PCT Pub. Date: Mar. 30, 2023

(65) Prior Publication Data

US 2025/0129870 A1 Apr. 24, 2025

(30) Foreign Application Priority Data

Sep. 22, 2021 (DE) ..................... 10 2021 124 552.4

(51) Int. Cl.
*F16L 43/00* (2006.01)
*F15D 1/04* (2006.01)

(52) U.S. Cl.
CPC ................ *F16L 43/00* (2013.01); *F15D 1/04* (2013.01)

(58) Field of Classification Search
CPC .................................... F16L 43/00; F15D 1/04
See application file for complete search history.

(56) References Cited

U.S. PATENT DOCUMENTS 5,230,369 A * 7/1993 Presz, Jr. ................ F16L 43/00
138/37
10,400,931 B2 9/2019 Souma et al.
(Continued)

FOREIGN PATENT DOCUMENTS

CN 204278378 U 4/2015
DE 3704827 A1 8/1988
(Continued)

OTHER PUBLICATIONS

International Search Report for International Application No. PCT/EP2022/075969 dated Jan. 31, 2023 (7 pages).
(Continued)

*Primary Examiner* — James M Hewitt, II

(74) *Attorney, Agent, or Firm* — REISING ETHINGTON, P.C.

(57) ABSTRACT

A line connector assembly and a line connector for fluidically connecting fluid lines is described. A housing has: a receiving space; a connecting piece; and a channel through which fluid can flow. The channel through which fluid can flow has a first straight channel portion and a curved channel portion. The curved channel portion directly adjoins the first straight channel portion in such a way that fluid can flow through, and the curved channel portion can be connected to a second straight channel portion in such a way that fluid can flow through. The curved channel portion has an inner channel line and an outer channel line, the outer channel being less strongly curved than the inner channel line. The outer channel line of the curved channel portion has, over an entire extent of the curved channel portion, a length (L).

11 Claims, 6 Drawing Sheets

(56)          References Cited

U.S. PATENT DOCUMENTS

| | | |
|---|---|---|
| 11,215,305 B2 | 1/2022 | Reuter et al. |
| 2009/0261579 A1 | 10/2009 | Spears |
| 2018/0128408 A1 | 5/2018 | Souma et al. |
| 2022/0128072 A1 | 4/2022 | Kintea et al. |

FOREIGN PATENT DOCUMENTS

| | | |
|---|---|---|
| DE | 10320562 A1 | 12/2004 |
| DE | 10360839 B3 | 6/2005 |
| DE | 102016119659 A1 | 4/2018 |
| EP | 3121502 A1 | 1/2017 |
| JP | 2003254490 A | 9/2003 |
| WO | WO2020161190 A1 | 8/2020 |

OTHER PUBLICATIONS

Written Opinion for International Application No. PCT/EP2022/075969 dated Jan. 31, 2023 (19 pages).
English Translation of International Application No. PCT/EP2022/075969 dated Jan. 31, 2023 (4 pages).

* cited by examiner

FLOW-OPTIMIZED LINE CONNECTOR, AND LINE CONNECTOR ASSEMBLY

INTRODUCTION

The disclosure relates to a line connector assembly and to a line connector thereof.

Line connectors, such as those specified by DE 10 2016 119 659 A1 or DE 20 2017 006 641 U1, are often used in a fluid circuit, for example a coolant circuit in a motor vehicle.

On the one hand, line connectors are used to connect two lines that are to be connected later for production or assembly reasons. On the other hand, it may also be technically necessary to split lines for other reasons. For example, because lines cannot usually be laid in tight radii, the lines are split in two at these tight radii and connected with an angled line connector. According to DE 20 2017 006 641 U1, the change of direction with the line connector is carried out with sharp edges at different angles, in particular at right angles. Pressure losses due to turbulence are a disadvantage here.

Less turbulence and therefore lower pressure losses occur in the design according to DE 10 2016 119 659 A1. Here, the line connector has a channel curvature for the change of direction. The channel curvature is created by a bent channel portion, which is formed between an inner channel line and an outer channel line. The outer channel line is less strongly curved here than the inner channel line.

Another disadvantage here may be that in the direction of flow behind the bend or the sharp kink in the inner channel line, this results in a turbulence that can be described as a dead water zone. The term dead water zone is independent of the actual fluid and is not limited to applications with water. The main fluid flow leads around this dead water zone along the outer channel line. Due to the reduced cross-section through which the fluid can flow around the dead water zone, the flow velocity in the region of the outer channel line is significantly higher than, for example, upstream. The flow only calms down again a long way downstream after the bend in the bent channel portion and approaches a flow profile that corresponds to a normal distribution in a linear pipe. In such a normal distribution, the velocity is zero directly adjacent to the pipe wall and then increases with increasing distance from the pipe wall.

Due to the pressure losses, more effort is required, for example in the form of larger pumps, in order to ensure the necessary fluid flow.

Such efforts may be therefore particularly detrimental to weight and energy consumption, which in turn reduces the range of vehicles, for example.

SUMMARY

One object per an embodiment of the disclosure is therefore to provide a line connector and a line connector assembly with a change of direction in which the resulting pressure losses are minimized or at least reduced. The solution should be as cost-effective, reliable, space-saving and easy to manufacture as possible.

The disclosure relates to a line connector assembly for fluidically connecting fluid lines, comprising a housing with a receiving space, a connection piece and a channel through which fluid can flow, wherein the channel through which fluid can flow has a first straight channel portion, a second straight channel portion and a bent channel portion, wherein the bent channel portion is arranged between the first and second straight channel portions and connects them to each other so that fluid can flow through them, wherein the bent channel portion has an inner channel line and an outer channel line, wherein the outer channel line is less strongly curved than the inner channel line. The outer channel line of the bent channel portion has a length L over an entire extent of the bent channel portion, wherein: $0.9*\alpha*d \leq L \leq 1.1*\alpha*d$. In particular, $L \geq 0.925*\alpha*d$. $\alpha$ is given here in radians.

The term "curved" can be used here synonymously with the term "bent".

The outer channel line can have a constant, but alternatively also different or changing curvatures and, for example, can be bent or meandering. Compared to conventional line connector assemblies, this results in an outer channel line that leads to low pressure losses.

A line portion of a line can be arranged in the receiving space, wherein the receiving space can extend around the second straight channel portion. The second straight channel portion can then be arranged in the inserted line. The diameters mentioned below refer to the channel portions through which fluid can flow, which can also be formed by a line portion of a line within the line connector.

The radius of the bend of the outer channel line is smaller, equal to or larger than the diameter of the first or second channel portion, wherein it corresponds in particular to between 0.50 and 1.5 times the diameter, preferably 1 time the diameter. With such a large radius and the associated widening of the bend in the region of the bent channel portion, the pressure loss due to the change in direction can be reduced by approx. 20% compared to a line connector with a smaller circumference, such as that shown in FIG. 1.

Another advantage, per an embodiment, is that previous line connectors can be replaced on a one-to-one basis, as there is no change to the line connector itself, apart from the bent channel portion. In particular, the connection dimensions and center distances do not change. This means that the line connector can also be used in confined spaces.

If the term 'connector' is used here, this is equivalent to a line connector. If the first and second channel portions have different diameters, the larger diameter can be used as the dimensioning standard if, for example, the difference between the radii is large, e.g. from 16 mm to 12 mm. Preferably, per an embodiment, the smaller diameter is used as the dimensioning scale if the difference between the radii is small, e.g. from 16 mm to 15 mm.

Alternatively, according to an embodiment, the dimensioning scale has a continuous transition between the diameters of the channel portions. The dimensioning scale can then be the mean value of the two diameters. The outer channel line of the bent channel portion can then have the length L over the entire extent of the bent channel portion with the following condition: $0.9*\alpha*D1 \leq L \leq 1.1*\alpha*D2$, wherein the dimensioning scale transitions continuously from the smaller diameter D1 of the two straight channel portions to the larger diameter D2 of the two straight channel portions. The outer channel line can be designed as a spline, for example, wherein the two straight channel portions have different inner diameters. In this case, the curvature of the outer channel line in the bent channel portion corresponds to a radius in the areas directly adjacent to the straight channel portions, which corresponds to the inner diameter of the respective adjacent channel portion.

The curvature of the outer channel line between the regions directly adjacent to the straight portions changes along the channel line. The change in curvature is preferably, per an embodiment, evenly distributed, wherein the first derivative of the curvature along the arc is constant over the entire channel line. This creates a uniform transition between the inner diameters of the two straight channel portions.

This embodiment may be advantageous, per an embodiment, because continuous/gentle/even changes in the flow channel cross-section cause a lower pressure loss than abrupt transitions, e.g. steps.

The inner channel line and the outer channel line are located on opposite sides of the channel cross-section of the bent channel portion and run parallel to the direction of flow of a fluid flowing through the channel. The inner channel line describes the area of the bent channel portion that is most curved or angled. The outer channel line describes an area of the bent channel portion that is the least strongly curved, but in particular still has a bend that extends from one end of the bent channel portion to the other end of the bent channel portion.

The outer channel line corresponds, for example, to a circular circumference portion. The center of the circle is preferably, per an embodiment, formed here by the inner channel line, which is point-shaped in particular. This means that the bent channel portion is maximally curved in the area of the inner channel line and in particular bends. In other words, the bent channel portion is angled at the inner channel line and is formed in particular by the two straight channel portions that meet.

In particular, the bent channel portion has the shape of a circle portion, wherein the radius of the circle on which the circle portion is based preferably corresponds to the diameter of the first and/or second straight channel portion.

The circle portion preferably corresponds to ⅛ to ½ of a corresponding circle with a radius equal to the diameter of the first and/or second straight channel portion.

In the case of a tangential transition of the bent channel portion to the first and second straight channel portions, the length L results, for example, from L=αf+2(d−f). Here, α is a deflection angle formed between the first and second straight channel portions, f is the radius of the bend of the bent channel portion and d is the diameter of the channel through which the fluid can flow.

Particularly preferably, per an embodiment, the outer channel line corresponds to a circular circumference portion that is ½π multiplied by the diameter of the first or second straight channel portion. With a corresponding deflection angle α of 90° or π/2 with a radius f=d, this results in a length L of 1.571*d.

Preferably, per an embodiment, the bending of the bent channel portion leads to a change in direction of the fluid flow through the channel, 0.1° to 120°, preferably by 45° to 120°, preferably by 60° to 110°, more preferably by 70° to 95°, particularly preferably by 90°.

Preferably, per an embodiment, the bent channel portion has a cross-sectional area that corresponds to a cross-sectional area of the first and/or second channel portion.

Preferably, per an embodiment, the first and second straight channel portions have a circular cross-section. Preferably, the bent channel portion can also have a substantially circular, egg-shaped or oval cross-section.

Preferably, per an embodiment, the outer channel line has a uniform radius over the entire length of the bent channel portion in the direction of flow.

In an embodiment, it is provided that the first or second straight channel portion is formed by a line portion of a fluid line accommodated in the receiving space.

The line portion held in the receiving chamber is in particular a spigot.

Preferably, per an embodiment, the bent channel portion is connected to the first straight channel portion in an integrally bonded manner, which in particular also comprises a one-piece manufacture of the channel portions. The second channel portion, which is formed in particular by a line portion accommodated in the line connector, is preferably connected to the bent channel portion in a fluid-tight and detachable manner, wherein the connected ends of the second straight channel portion and the bent channel portion are formed in particular perpendicular to the direction of flow of the fluid in the second straight channel portion.

According to an embodiment, in a first aspect it is provided that the bent channel portion has at least one widening.

A line connector according to an embodiment is preferably manufactured by injection molding with two cores that form the channel through which a fluid can flow and are positioned at a 90° angle to each other. The problem here, however, is that if the curved region of the bent channel portion is enlarged, undercuts become necessary in the mold, which makes production complex and expensive.

By adapting the bent channel portion, for example by widening it, corresponding undercuts on the production tool can be avoided or compensated for.

Undercuts can be avoided, for example, by arranging flattenings in the region of the inner channel line, in particular in the circumferential direction of the bent channel portion on both sides of the inner channel line and at a distance from it, but in particular closer to the inner channel line than to the outer channel line in the circumferential direction. In cross-section, the bent channel portion has a substantially circular cross-section without widenings or flattenings. The flattenings flatten the bend of the circular circumference of the bent channel portion in cross-section. This prevents undercuts on the tool during the production of a corresponding line connector.

However, the two flattenings in particular reduce the flow cross-section in the region of the flattenings. A constant flow cross-section is advantageous in order to keep the pressure loss as low as possible. It is therefore preferable, per an embodiment, to provide at least one additional widening, which in particular compensates for the reduced cross-sectional area of the bent channel portion due to the flattenings.

In an embodiment, it is provided that the bent channel portion has one, in particular two widenings, which are arranged in particular in the circumferential direction of the bent channel portion on both sides and at a distance from the outer channel line.

Preferably, per an embodiment, the two widenings are arranged closer to the outer channel line than to the inner channel line when viewed in the direction of contact and thus in the cross-section of the bent channel portion. The widenings widen the circular circumference of the bent channel portion in cross-section, in particular in comparison to a uniform circular cross-section.

This results in an enlarged flow cross-section, which has a beneficial effect on a uniform flow, according to an embodiment.

Both the flattening(s) and the widening(s) lead to deviations from a circular cross-section of the bent channel portion.

Preferably, per an embodiment, the area reduced by one or more flattenings in the cross-section of the bent channel portion is equal to the additional area in the cross-section of the bent channel portion due to the one or more widenings.

This ensures that the flow cross-section remains constant. This is advantageous per an embodiment in order to reduce the pressure loss.

The line connector ensures a constant flow cross-section of the bend without the need for complex tools.

In addition, a line connector with flattenings, in particular to avoid undercuts, and widenings to equalize the flow cross-section, with a correspondingly bent course of the outer channel line of the bent channel portion, leads to a reduction in pressure loss of around 24% compared to a line connector as shown in FIG. 1.

According to an embodiment, the first straight channel portion according to a second aspect has a cut-out in an area adjacent to the inner channel line of the bent channel portion. In this case, two edge portions of an edge of the bent channel portion extend from the outer channel line to opposite end portions of the cut-out.

The region of the first straight channel portion that is arranged on the inner channel line corresponds to the region that would be at least partially in direct contact with the inner channel line without the cut-out and forms the end of the first straight channel portion.

In an embodiment, it is provided that two edges are formed by the cut-out in the region of the inner channel line, wherein a first edge is formed by one end of the line portion accommodated in the receiving space and a second edge is formed by a wall of the first straight channel portion in which the cut-out is arranged.

The cut-out now deflects the flow through the line connector around two edges. One edge is formed by one end of the second straight channel portion, which is formed by the spigot of a connected line fixed in the housing. The other edge is formed by the housing itself, through the cut-out provided. The two edges can each have a half angle of deflection in contrast to a line connector without a cut-out, wherein the angle depends on the position of the spigot. With a correspondingly large radius of the bend of the bent channel portion, a 40% reduction in pressure loss can be achieved compared to a line connector as shown in FIG. 1. The change in direction with a line connector with a cut-out has a similar effect to a line connector with a bent inner channel line.

In an embodiment, it is provided that the cut-out is defined by a wall of the line portion accommodated in the receiving space and by a wall of the first straight channel portion.

In a further embodiment, a connecting line between the inner channel line and an inner edge of a line portion inserted into the receiving space, at which the second straight channel portion begins, can include an angle of 30° to 90°, preferably 40° to 80°, further preferably 45° to 60°, with an extent direction of the second straight channel portion.

In a longitudinal section of a line connector along the direction of flow, the connecting line is centered at the corresponding position. The longitudinal section can be selected in such a way that the first channel portion extends at a 90° angle from the longitudinal section.

In addition, the disclosure comprises a line connector for fluidically connecting fluid lines, comprising a housing with a receiving space, a connection piece and a channel through which fluid can flow, wherein the channel through which fluid can flow has a first straight channel portion and a bent channel portion, wherein the bent channel portion is directly connected to the first straight channel portion in such a manner that fluid can flow through and is connectable to a second straight channel portion in such a manner that fluid can flow through, wherein the bent channel portion has an inner channel line and an outer channel line, wherein the outer channel line is less strongly curved than the inner channel line, wherein the outer channel line of the bent channel portion has a length L over an entire extent of the bent channel portion, wherein, if the channel (5) through which fluid can flow has a diameter d, the following applies: $0.9*\alpha*d \leq L \leq 1.1*\alpha*d$. In particular, $L \geq 0.925*\alpha*d$, and wherein, if one of the two straight channel portions (6, 7) has a smaller diameter D1 and the other of the two straight channel portions (6, 7) has a larger diameter D2, the following applies: $0.9*\alpha*D1 \leq L \leq 1.1*\alpha*D2$.

As explained above, the outer channel line can have a constant, but alternatively also different or changing curvatures here and, for example, can be bent or meandering. For example, the outer channel line can also follow a circular circumference. Compared to conventional line connectors, this results in an outer channel line that leads to low pressure losses.

Preferably, per an embodiment, the radius of the bend is greater than half the diameter of the first and/or second straight channel portion. This allows the pressure losses to be reduced.

A line connector of this type makes it possible to reduce the pressure loss that is usually caused by a corresponding change of direction.

Preferably, per an embodiment, the outer channel line of the bent channel portion has a bend over an entire extent of the bent channel portion in the direction of flow, wherein the outer channel line corresponds to a circular circumference portion which corresponds to $\frac{1}{8}\pi$ to $\frac{2}{3}\pi$ times a diameter of the first and/or second straight channel portion.

The inner and outer channel lines extend substantially parallel to the direction of flow within the bent channel portion, wherein potentially occurring turbulence in the direction of flow is disregarded. The outer channel line corresponds to the outermost region of the channel, perpendicular to the longitudinal extent of the bent channel portion, which is bent in particular to change the direction of the flowing fluid.

Preferably, per an embodiment, the bend of the circle portion, and thus also the outer channel line, describes a constant circular arc, which is equivalent to the circumference of a circle portion, which is dependent on a radius equal to the diameter of the first straight channel portion.

The inner channel line is the extent of the bent channel portion that has the strongest bend in the direction of flow. For example, if the bent channel portion has a kink that is substantially angled, the inner channel line is substantially point-shaped.

In an embodiment, it is provided that the outer channel line of the bent channel portion corresponds to a circular circumference portion which is substantially $\frac{1}{2}\pi$ multiplied by the diameter of the first straight channel portion.

The bent channel portion can substantially correspond here to a quarter circle, wherein the center of the circle is formed by the inner channel line, from which in particular a circle with a radius equal to the diameter of the first straight channel portion is formed. The inner channel line is preferably point-shaped, according to an embodiment. This means that the bent channel has a kink, which is arranged opposite the outer channel line, particularly in the cross-section of the bent channel portion.

A line connector with a bent channel portion, wherein the outer channel line corresponds to a circular circumference portion of $\frac{1}{2}\pi$ of the diameter of the first straight channel portion, allows the flowing fluid to change direction by 90°.

According to an embodiment, in a first aspect it is provided that the bent channel portion has at least one widening.

A line connector according to an embodiment is preferably manufactured by injection molding with two cores that form the channel through which a fluid can flow and are positioned at a 90° angle to each other. The problem here, however, is that if the curved region of the bent channel portion is enlarged, undercuts become necessary in the mold, which makes production complex and expensive.

By adapting the bent channel portion, for example by widening it, corresponding undercuts on the production tool can be avoided or compensated for.

Undercuts can be avoided, for example, by arranging flattenings in the region of the inner channel line, in particular in the circumferential direction of the bent channel portion on both sides of the inner channel line and at a distance from it, but in particular closer to the inner channel line than to the outer channel line in the circumferential direction. In cross-section, the bent channel portion has a substantially circular cross-section without widenings or flattenings. The flattenings flatten the bend of the circular circumference of the bent channel portion in cross-section. This prevents undercuts on the tool during the production of a corresponding line connector.

However, the two flattenings in particular reduce the flow cross-section in the region of the flattenings. A constant flow cross-section is advantageous, per an embodiment, in order to keep the pressure loss as low as possible. It is therefore preferable, per an embodiment, to provide at least one additional widening, which in particular compensates for the reduced cross-sectional area of the bent channel portion due to the flattenings.

In an embodiment, it is provided that the bent channel portion has one, in particular two widenings, which are arranged in particular in the circumferential direction of the bent channel portion on both sides and at a distance from the outer channel line.

Preferably, per an embodiment, the two widenings are arranged closer to the outer channel line than to the inner channel line when viewed in the direction of contact and thus in the cross-section of the bent channel portion. The widenings widen the circular circumference of the bent channel portion in cross-section, in particular in comparison to a uniform circular cross-section.

This results in an enlarged flow cross-section, which has an advantageous effect per an embodiment on a uniform flow.

Both the flattening(s) and the widening(s) lead to deviations from a circular cross-section of the bent channel portion.

Preferably, per an embodiment, the area reduced by one or more flattenings in the cross-section of the bent channel portion is equal to the additional area in the cross-section of the bent channel portion due to the one or more widenings. This ensures that the flow cross-section remains constant. This is advantageous per an embodiment in order to reduce the pressure loss.

The line connector ensures a constant flow cross-section of the bend without the need for complex tools.

In addition, a line connector with flattenings, in particular to avoid undercuts, and widenings to equalize the flow cross-section, with a correspondingly bent course of the outer channel line of the bent channel portion, leads to a reduction in pressure loss of around 24% compared to a line connector as shown in FIG. 1.

According to an embodiment, in a second aspect, it is provided that the first straight channel portion has a cut-out in a region adjacent to the inner channel line of the bent channel portion. In this case, two edge portions of an edge of the bent channel portion extend from the outer channel line to opposite end portions of the cut-out.

The region of the first straight channel portion that is arranged on the inner channel line corresponds to the region that would be at least partially in direct contact with the inner channel line without the cut-out and forms the end of the first straight channel portion.

In an embodiment, it is provided that two edges are formed by the cut-out in the region of the inner channel line, wherein a first edge is formed by one end of the line portion accommodated in the receiving space and a second edge is formed by a wall of the first straight channel portion in which the cut-out is arranged.

The cut-out now allows the flow through the line connector to be deflected around two edges. One edge can be formed by one end of the second straight channel portion, which is formed by the spigot of a connected line fixed in the housing. The other edge can be formed by the housing itself, through the cut-out provided. The two edges each have a half angle of deflection in contrast to a line connector without a cut-out. In conjunction with a large radius of the outer channel line of the bent channel portion, this can lead to a 40% reduction in pressure loss compared to a line connector as shown in FIG. 1. The change in direction with a line connector with a cut-out has a similar effect to a line connector with a bent inner channel line.

The cut-out forms an igloo-shaped contour with the edge of the bent channel portion in cross-section. The bent channel portion can have a line transverse to the flow direction that corresponds to a U, the opening and legs of which point towards the inner channel line. The cut-out can connect the legs with each other so that, if the cut-out is at the bottom and the bent channel portion is at the top, the contour of an igloo is formed.

It is advantageous, per an embodiment, if one edge of the bent channel portion is rounded at the cut-out with the smallest possible radius, e.g. 0.1 mm. This allows the pressure loss in the power connector to be further minimized.

In an embodiment, it is provided that at least one guide element is arranged within the bent channel portion, which changes the flow direction of at least part of a fluid flowing through.

Such a guide element is already described in the disclosure WO 2020/161190 A1, to which reference is hereby made. The content of application WO 2020/161190 A1 is hereby incorporated into this application.

The guide element is preferably bent, per an embodiment, in particular in such a way that the curvature of the guide element is adapted to the change in direction of the flow caused by the curvature of the bent channel portion and supports it.

In an embodiment, it is provided that three guide elements are arranged parallel to each other and at a distance from each other within the bent channel portion. At this point, parallel guide elements are understood to mean that only individual edges of the guide elements arranged transverse to the direction of flow are parallel to each other.

In other words, the three guide elements are stacked at a distance from each other, wherein the stack formed extends from the inner channel line to the outer channel line.

The guide elements can reduce the pressure loss by up to 62% compared to a line connector as shown in FIG. 1.

The described features of the line connector also apply in relation to the line connector of the line connector assembly, and vice versa.

BRIEF DESCRIPTION OF THE FIGURES

Further features, details and advantages of the invention will become apparent from the wording of the claims and from the following description of exemplary embodiments with reference to the drawings, in which:

FIG. 3a shows the shape of the channel of the embodiment shown in FIG. 2a,

FIG. 3b shows a cross-section of the embodiment shown in FIG. 2a,

FIG. 4b shows the shape of the channel of the embodiment in FIG. 4a,

DETAILED DESCRIPTION

Figure 1:
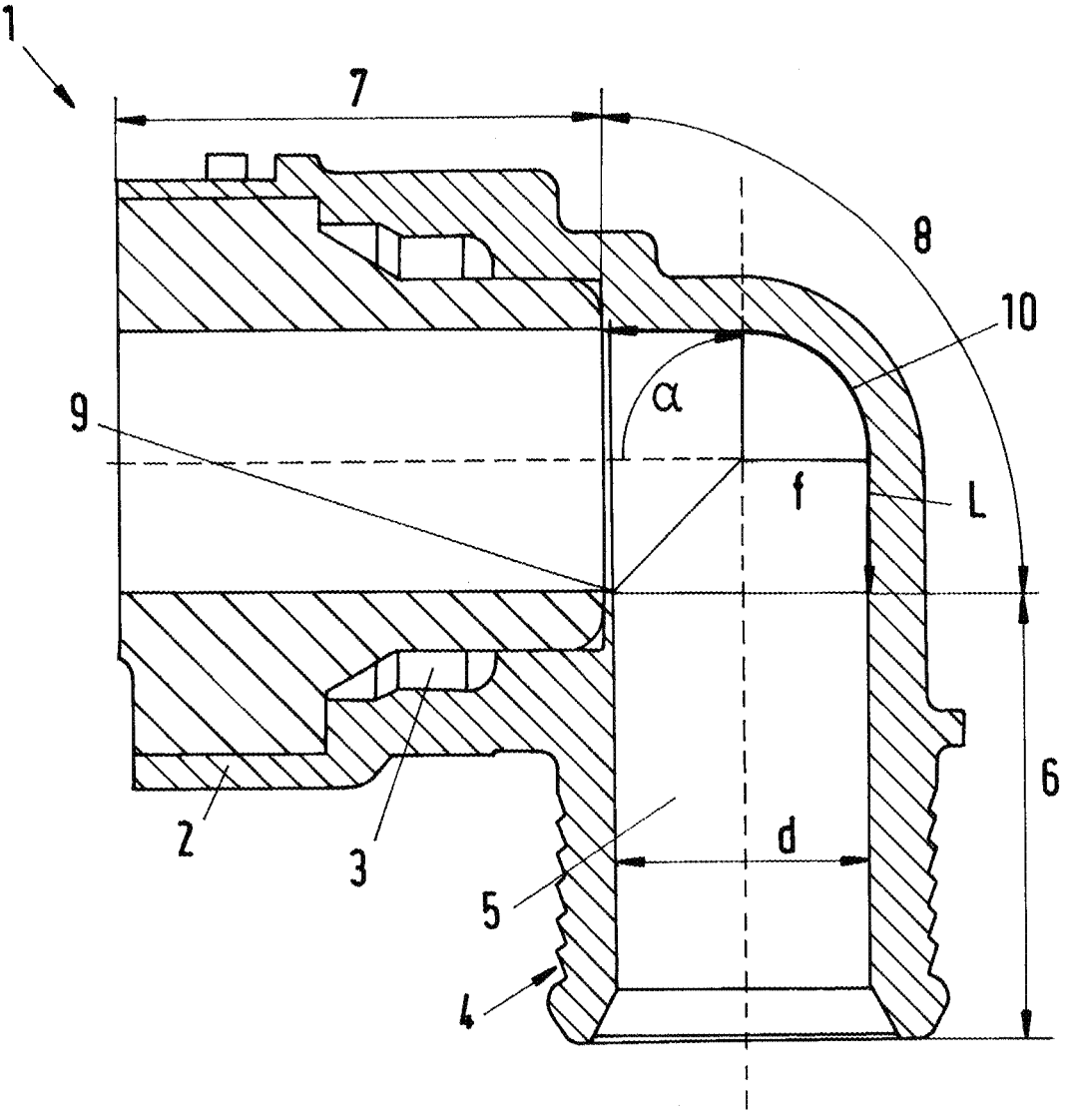
FIG. 1 shows a prior art line connector.

FIG. 1 shows a sectional view of a line connector 1 or a line connector assembly, as is currently used as standard for fluidically connecting fluid lines. The line connector 1 comprises a housing 2 with a receiving space 3, a connection piece 4, and a channel 5 through which fluid can flow. The channel 5 is formed from a first straight channel portion 6, a second straight channel portion 7 and a bent channel portion 8. The bent channel portion 8 is arranged between the first and second straight channel portions 6 and 7 and connects them to each other so that fluid can flow directly through them. The bent channel portion has an inner channel line 9 and an outer channel line 10. The inner channel line 9 is substantially point-shaped, which means that the bent channel portion 8 bends sharply in this region. The outer channel line 10 describes the bend of the bent channel portion, which deflects a change in direction of a fluid flowing through by 90°. The outer channel line 10 has a bend between two straight regions, which corresponds to a circular circumference portion that is a quarter circle with a radius equal to half the diameter of one of the straight channel portions 6, 7. Thus, the outer channel line 10 is only partially curved and follows a circular circumference portion corresponding to ¼π multiplied by the diameter of the first and/or second straight channel portion 6, 7.

The second straight channel portion 7 is formed here by a pin arranged in the receiving chamber 3.

Figure 2A:
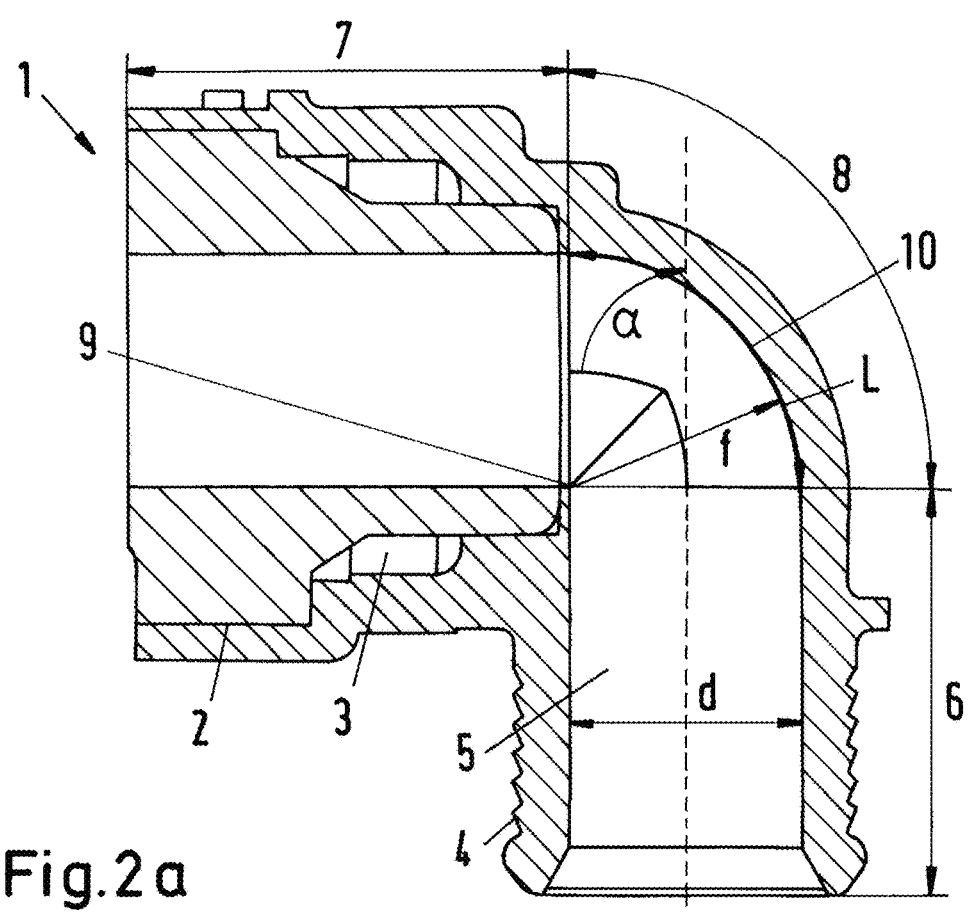
FIG. 2a shows a first embodiment of a line connector.

FIG. 2a shows a sectional view of a line connector 1 with a housing 2, which forms a receiving space 3 and a connection piece 4. The channel 5 comprises a first straight channel portion 6 and a bent channel portion 8. A second straight channel portion 7 is formed by a spigot of a connected fluid line arranged in the receiving space 3 of the line connector 1.

The bent channel portion 8 has an inner channel line 9 and an outer channel line 10. The outer channel line 10 is less strongly curved than the inner channel line 9, which in the embodiment shown is substantially point-shaped and corresponds to the bend between the two straight channel portions 6, 7. The outer channel line 10 of the bent channel portion 8 has a bend parallel to the direction of flow of a potentially flowing fluid over the entire length of the bent channel portion 8. The bend which the outer channel line 10 follows corresponds to a circular circumference portion which is $0.9*\alpha$ to $1.1*\alpha$ times a diameter d of the first and second straight channel portions 6, 7.

Figure 2B:
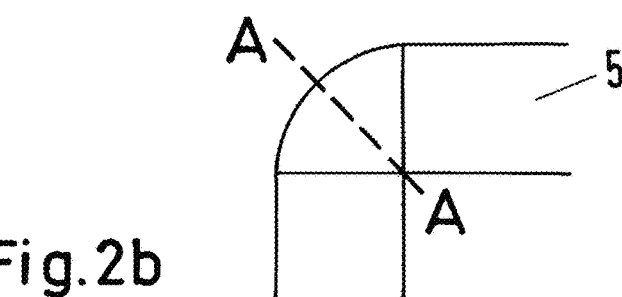
FIG. 2b shows the shape of a channel with undercut.
Figure 2C:
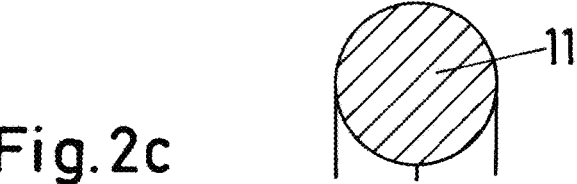
FIG. 2c shows a cross-section of the channel from FIG. 2b

FIG. 2b shows a channel portion with a circular cross-section, which has undercuts and therefore cannot be demolded. For clarity, the course of the channel 5 is shown without the surrounding housing 2. A section through line A-A in FIG. 2b is shown in FIG. 2c as a cross-section 11 through the bent channel portion 8. This is substantially circular and preferably has a diameter that is equal to the diameter of the first and/or second straight channel portion.

Figure 3A:
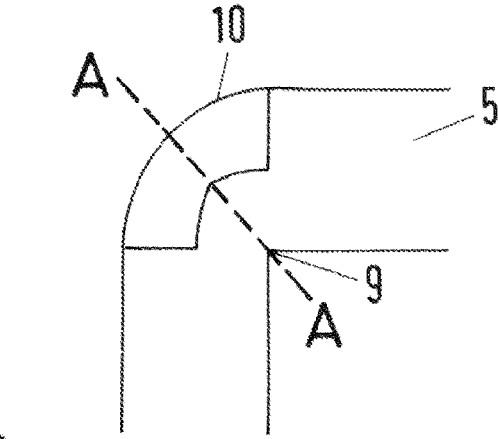
Figure 3B:
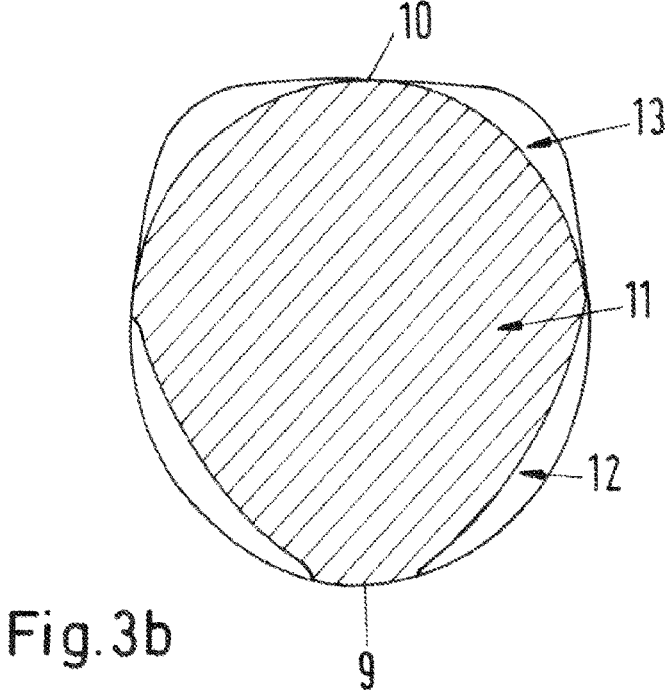

FIG. 3a shows a further embodiment of a channel 5 of a line connector 1, wherein the line connector in sectional view corresponds substantially to the embodiment in FIG. 2a. In this embodiment, two flattenings 12 and two widenings 13 are provided to avoid undercuts during the manufacture of a line connector. As can be seen in the cross-section 11 of the bent channel portion 11 in FIG. 3b, the two flattenings 12 are arranged on both sides of the inner channel line 9 and at a distance from it. However, the flattenings 12 are arranged closer to the inner channel line 9 than to the outer channel line 10. The two widenings 13, on the other hand, are arranged on both sides of the outer channel line 10 and at a distance from it, but closer to the outer channel line 10 than to the inner channel line 9.

Overall, the widenings 13 create an additional cross-sectional area, which may in particular be of the same order of magnitude as the cross-sectional area that was reduced by the flattenings 12.

Figure 4A:
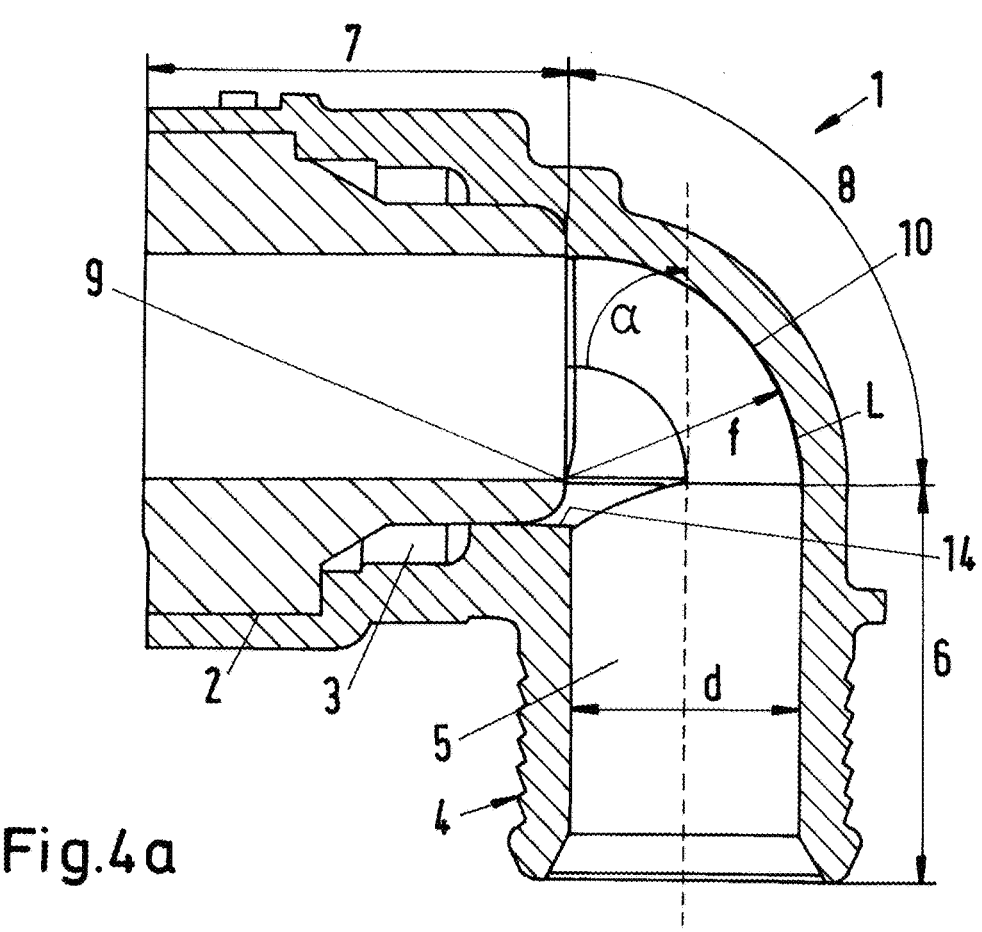
FIG. 4a shows a second embodiment of a line connector.

FIG. 4a likewise shows a sectional view of a line connector 1 according to the invention, wherein this has a cut-out 14 in addition to the embodiment in FIG. 2a. This cut-out 14 is arranged in a wall of the first straight channel portion 6 in a region that borders on the inner channel line 9 of the bent channel portion 8.

Figure 4B:
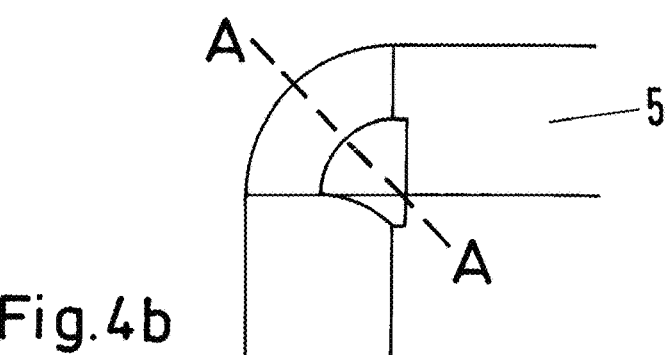
Figure 4C:
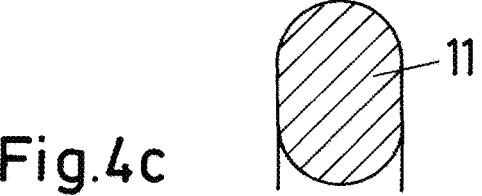
FIG. 4c shows a cross-section of the channel from FIG. 4b.

FIG. 4b shows a sectional view of the channel 5 of the line connector 1 from FIG. 4a. With a section through line A-A, the cross-section of the bent portion 11 is obtained as shown in FIG. 4c. The cut-out 14 thus has a shape that enlarges the cross-section 11 of the bent channel portion 8.

Figures 4D, 4E, 5:
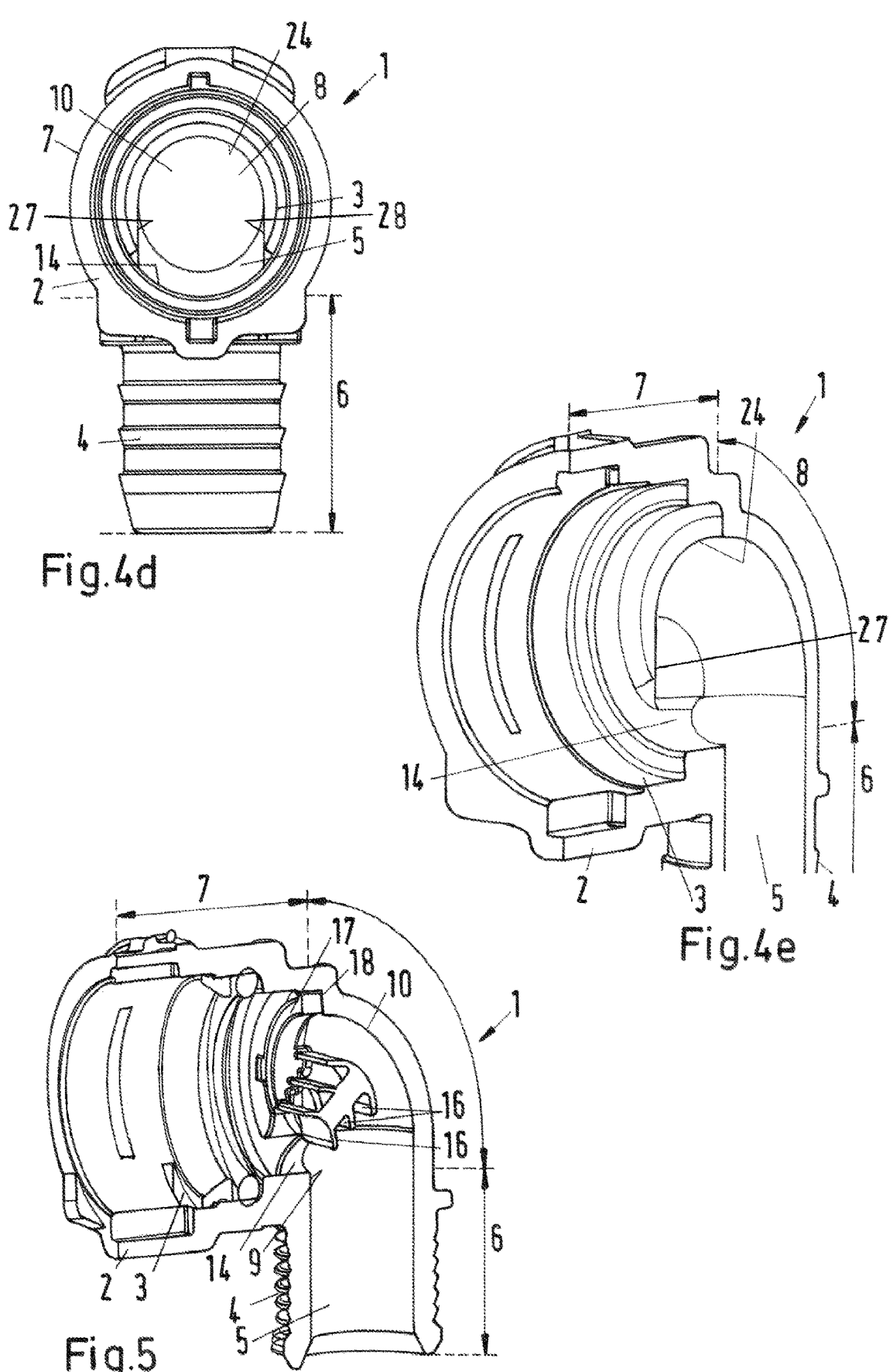
FIG. 4d shows a view into the second straight channel portion.
FIG. 4e shows a three-dimensional sectional view of the line connector from FIG. 4a FIG. 5 shows a third embodiment of the line connector with guide elements.

The cut-out 14 is likewise shown in FIGS. 4d and 4e. FIG. 4d shows a view of the line connector 1 in the receiving space 3. The cut-out 14 forms an igloo shape with the edge 24 of the bent channel portion 8. Two edge portions 27, 28 of the edge 24 extend from the outer channel line 10 to the cut-out 14. The two edge portions 27, 28 form the side walls of the igloo shape, wherein the cut-out 14 forms a floor of the igloo shape and the region around the outer channel line 10 forms the roof of the igloo shape.

FIG. 4e shows a three-dimensional sectional view of the line connector 1. In this view, the shape of the wall of the bent channel portion 8 is visible. At the first straight channel portion 6, the cross-section of the bent channel portion 8 has an elliptical, preferably circular, shape in this example. At the second, straight channel portion 7, the cross-section of the bent channel portion 8 can have an igloo shape due to the cut-out 14.

It is advantageous, per an embodiment, if the edge 24 and the edge portions 27, 28 at the entrance to the bent channel portion 8 have the smallest possible radius, e.g. between 0 and 1 mm, preferably 0.1 mm. This allows the pressure loss in the power connector to be further minimized.

FIG. 5 shows a further embodiment of the line connector 1. Three guide elements 16 are positioned in the bent channel portion 8 and are arranged parallel to each other and at a distance from each other. The guide elements 16 are attached to a carrier 17, which is mounted in a receptacle 18 on the bent channel portion 8.

Figure 6A:
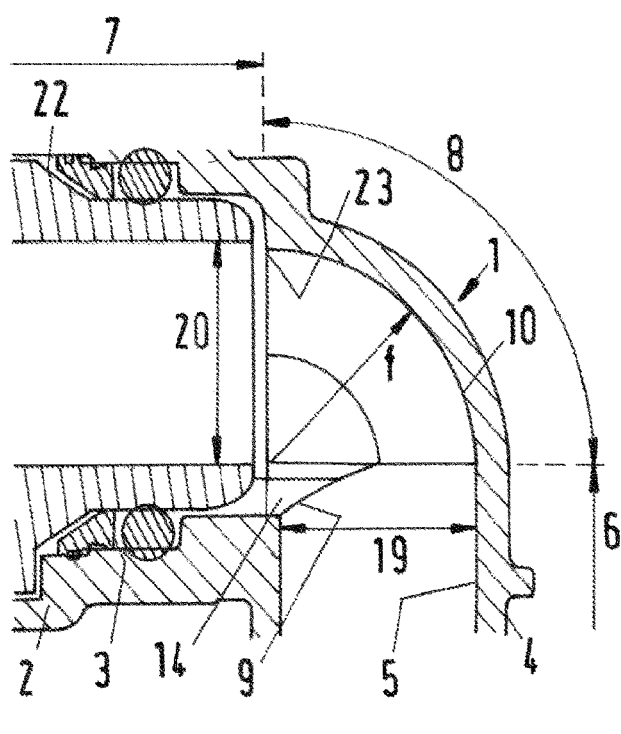
FIG. 6a shows a longitudinal sectional view of a fourth embodiment of the line connector.
Figure 6B:
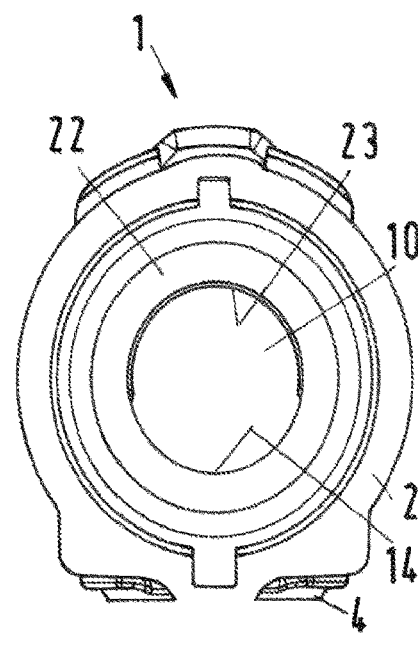
FIG. 6b shows a view of the second straight channel portion with inserted line portion.

FIGS. 6a and 6b show a further embodiment of the line connector 1 with a cut-out 14.

FIG. 6a shows the first inner diameter 19 of the first straight channel portion 6. The second inner diameter 20 of the second straight channel portion 7 is also shown. The radius f of the outer channel line 10 is also shown. If the first and second inner diameters 19, 20 have a small difference, e.g. with a first inner diameter 19 of 15 mm and a second inner diameter 20 of 16 mm, the value of the smaller inner diameter, in this case 15 mm, can be selected for the radius f.

As shown in FIG. 6b, at the transition between a line portion 22 of a line, which is inserted into the receiving space 3 of the second straight channel portion 7, and the bent channel portion 8, a step 23 is then arranged at the end of the outer channel line 10 facing the second straight channel portion 7. A pressure loss occurs at the step 23 in the fluid flowing through the channel 5. In this case, the step 23 is comparatively flat, so that the pressure loss is minimal.

If the first inner diameter 19 and the second inner diameter 20 have a large difference, e.g. if the first inner diameter 19 has a value of 12 mm and the second inner diameter 20 has a value of 16 mm, then the value 16 mm can be selected for the radius f in this case.

Figure 7:
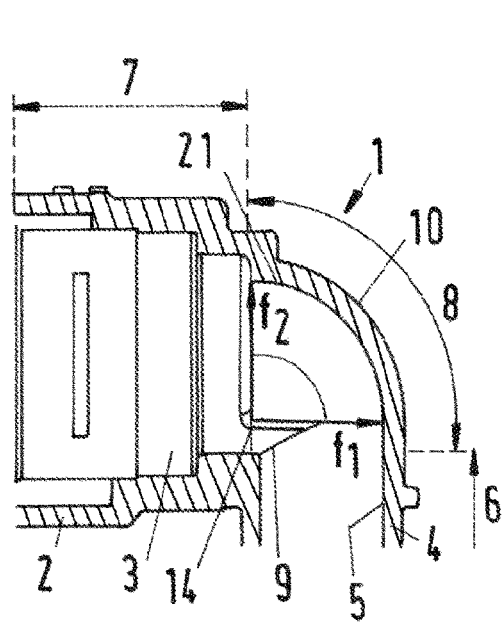
FIG. 7 shows a fifth embodiment of the line connector.

FIG. 7 shows a further embodiment of the radius f. In the event that the channel portions 6 and 7 have different inner diameters 19, 20, the curvature of the outer channel line 10 in the bent channel portion 8 in the regions directly adjacent to the straight channel portions 6, 7 can correspond to a radius which corresponds to the inner diameter 19, 20 of the respective adjacent channel portion 6, 7.

In this example, the curvature of the outer channel line 10 between the regions directly adjacent to the straight channel portions 6, 7 changes along the outer channel line 10. The change in curvature is preferably, per an embodiment, evenly distributed over the entire outer channel line 10, i.e., the first derivative of the curvature along the outer channel line 10 is constant. This creates a uniform transition between the inner diameters 19, 20 of the first straight channel portion 6 and the second straight channel portion 7. The outer channel line 10 can, for example, be designed as a spline 21, with the boundary conditions that the spline 21 at the first straight channel portion 6 corresponds to a radius f which corresponds to the first inner diameter 19, and at the second straight channel portion 7 corresponds to a radius 23 which corresponds to the second inner diameter 20. The change in radius 23 along the outer channel line 10 therefore corresponds in this example to a transition between two different radii.

This embodiment may be advantageous, per an embodiment, because steady/gentle/even changes in the flow cross-section of the channel 5 cause a lower pressure loss than abrupt transitions, such as when a step 23 is arranged in the channel 5.

Figure 8:
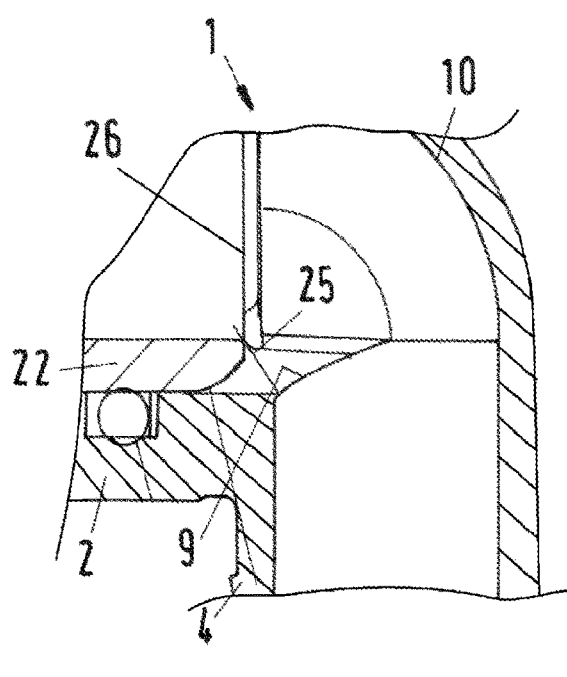
FIG. 8 shows a sixth embodiment of the line connector.

FIG. 8 shows a further embodiment of the line connector 1. Here, a line portion 22 is arranged in the receiving space 3. At the inner channel line 9, the line portion 22 is spaced from the first straight channel portion 6 in such a way that a connecting line 25 between the inner channel line 9 and an inner edge 26 of the line portion 22, at which the second straight channel portion 7 begins, forms an angle of 30° to 90°, preferably 40° to 80°, more preferably 45° to 60°, with a direction of extent of the second straight channel portion 7. This further reduces the pressure loss in the line connector 1.

The invention is not limited to one of the embodiments described above, but can be modified in a variety of ways.

All features and advantages resulting from the claims, the description and the drawing, including design details, spatial arrangements and process steps, can be essential to the invention both individually and in various combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 1 line connector/line connector assembly
2 housing
3 receiving space
4 connection piece
5 channel
6 first straight channel portion
7 second straight channel portion
8 bent channel portion 9 inner channel line
10 outer channel line
11 cross-section of the bent channel portion 8
12 flattenings
13 widenings
14 cut-out
16 guide element
17 carrier
18 receptacle
19 first inner diameter
20 second inner diameter
21 spline
22 line portion
23 step
24 edge
25 connecting line
26 inner edge
27 edge portion
28 edge portion
d diameter
α deflection angle
L length
F radius

The invention claimed is:

1. A line connector assembly for fluidically connecting fluid lines, comprising a housing with a receiving space, a connection piece and a channel through which fluid can flow, wherein the channel through which fluid can flow has a first straight channel portion and a second straight channel portion, with a deflection angle α formed therebetween, and a bent channel portion, wherein a is given in radians, wherein the bent channel portion is arranged between the first and second straight channel portions and connects them to one another so that fluid can flow through them, wherein the bent channel portion has an inner channel line and an outer channel line, wherein the outer channel line is less strongly curved than the inner channel line, wherein the outer channel line of the bent channel portion has a length L over an entire extent of the bent channel portion, wherein, when the channel through which fluid can flow has a diameter d, $0.9*\alpha*d \leq L \leq 1.1*\alpha*d$, and when one of the first and second straight channel portions has a smaller diameter D1 and the other of the first and second straight channel portions has a larger diameter D2, $0.9*\alpha*D1 \leq L \leq 1.1*\alpha*D2$, wherein the first straight channel portion, in a region adjacent to the inner channel line of the bent channel portion, has a cut-out, wherein two edge portions of an edge of the bent channel portion extend from the outer channel line to opposite end portions of the cut-out, wherein the line connector assembly has a line portion that is accommodated in the receiving space, wherein the cut-out is delimited by a wall of the line portion accommodated in the receiving space and by a wall of the first straight channel portion.

2. The line connector assembly according to claim 1, wherein the first or second straight channel portion is formed by the line portion accommodated in the receiving space, wherein the line portion is of a fluid line.

3. The line connector assembly as claimed in claim 1, wherein two edges are formed by the cut-out in the region of the inner channel line, wherein a first edge is formed by one end of the line portion accommodated in the receiving space and a second edge is formed by the wall of the first straight channel portion in which the cut-out is arranged.

4. The line connector assembly as claimed in claim 1, wherein a connecting line between the inner channel line and an inner edge of the line portion inserted into the receiving space, at which the second straight channel portion begins, encloses an angle of 30° to 90°, with a direction of extent of the second straight channel portion.

5. The line connector assembly as claimed in claim 1, wherein the outer channel line of the bent channel portion corresponds to a circular circumference portion which is ½ π multiplied by the diameter (d) of the first straight channel portion.

6. The line connector assembly as claimed in claim 1, wherein, the bent channel portion has at least one widening, which is arranged in the circumferential direction of the bent channel portion on either side of and/or at a distance from the outer channel line.

7. The line connector assembly as claimed in claim 1, wherein at least one guide element is arranged inside the bent channel portion, which changes the flow direction of at least part of a fluid flowing through.

8. The line connector assembly as claimed in claim 1, wherein three guide elements are arranged parallel to one another and spaced apart from one another within the bent channel portion.

9. The line connector assembly as claimed in claim 1, wherein a connecting line between the inner channel line and an inner edge of the line portion inserted into the receiving space, at which the second straight channel portion begins, encloses an angle of 40° to 80°, with a direction of extent of the second straight channel portion.

10. The line connector assembly as claimed in claim 1, wherein a connecting line between the inner channel line and an inner edge of the line portion inserted into the receiving space, at which the second straight channel portion begins, encloses an angle of 45° to 60°, with a direction of extent of the second straight channel portion.

11. The line connector assembly as claimed in claim 1, wherein the cut-out is further delimited by a wall of the second straight channel portion.

* * * * *